(12) United States Patent
Adams et al.

(10) Patent No.: US 8,081,171 B2
(45) Date of Patent: Dec. 20, 2011

(54) DIGITAL PEN AND A METHOD OF STORING DIGITAL RECORDS OF THE USE MADE OF THE DIGITAL PEN

(75) Inventors: Guy de Warrenne Bruce Adams, Stroud (GB); Andrew MacKenzie, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1266 days.

(21) Appl. No.: 11/082,049

(22) Filed: Mar. 17, 2005

(65) Prior Publication Data
US 2005/0207823 A1 Sep. 22, 2005

(30) Foreign Application Priority Data
Mar. 20, 2004 (GB) .................................. 0406328.5

(51) Int. Cl.
*G06F 3/033* (2006.01)

(52) U.S. Cl. .................. 345/179; 178/19.01; 178/19.04; 178/19.05

(58) Field of Classification Search .................. 345/169, 345/173–184; 178/18.01–18.07, 19.01–19.06; 382/115–125, 186–190, 313–314
See application file for complete search history.

(56) References Cited

U.S. PATENT DOCUMENTS

| | | | | |
|---|---|---|---|---|
| 5,850,058 A * | 12/1998 | Tano et al. | .................. | 178/18.01 |
| 6,307,956 B1 * | 10/2001 | Black | .......................... | 382/124 |
| 6,633,282 B1 * | 10/2003 | Monroe | ........................ | 345/179 |
| 7,009,594 B2 * | 3/2006 | Wang et al. | .................... | 345/156 |
| 7,082,213 B2 * | 7/2006 | Black | .......................... | 382/124 |
| 7,082,444 B2 * | 7/2006 | Braun et al. | ................... | 707/203 |
| 7,110,576 B2 * | 9/2006 | Norris et al. | .................. | 382/119 |
| 7,149,503 B2 * | 12/2006 | Aarnio et al. | .............. | 455/414.1 |
| 7,176,906 B2 * | 2/2007 | Williams et al. | .............. | 345/179 |
| 7,353,988 B1 * | 4/2008 | Ramachandran | ............. | 235/379 |
| 7,383,984 B2 * | 6/2008 | Silverbrook et al. | ......... | 235/375 |
| 7,712,675 B2 * | 5/2010 | Balinsky et al. | .............. | 235/492 |
| 2002/0025062 A1 * | 2/2002 | Black | ........................... | 382/116 |
| 2004/0056849 A1 * | 3/2004 | Lohbihler et al. | ............. | 345/173 |
| 2004/0113896 A1 * | 6/2004 | Monroe | ........................ | 345/179 |
| 2004/0134994 A1 * | 7/2004 | Zaba et al. | ..................... | 235/492 |
| 2004/0230542 A1 * | 11/2004 | Obrea | .......................... | 705/401 |
| 2005/0024346 A1 * | 2/2005 | Dupraz et al. | ................. | 345/179 |
| 2005/0136886 A1 * | 6/2005 | Aarnio et al. | .............. | 455/404.2 |
| 2007/0005849 A1 * | 1/2007 | Oliver | ............................. | 710/72 |

(Continued)

FOREIGN PATENT DOCUMENTS

EP 1016947 A2 7/2000
(Continued)

OTHER PUBLICATIONS

UK Search Report ~ dated Jun. 15, 2005.
(Continued)

*Primary Examiner* — Vijay Shankar (57) ABSTRACT

A digital pen of the kind having means to sense and create a digital record of the use made of the pen and a memory in which the digitised record is stored also includes a reader for communication with memory tags by inductive coupling. The means to sense and create a digital record of the use made of the pen may include a camera. Preferably the reader for communication with memory tags is located at the opposite end of the pen from a nib for convention writing, and the pen includes a battery power supply.

29 Claims, 5 Drawing Sheets

U.S. PATENT DOCUMENTS

2007/0095928 A1* 5/2007 Balinsky et al. ............ 235/492
2007/0194127 A1* 8/2007 Rathus et al. ............ 235/472.02

FOREIGN PATENT DOCUMENTS

| | | |
|---|---|---|
| EP | 1016947 A2 | 7/2000 |
| EP | 1 403 755 | 3/2004 |
| EP | 1403755 A2 | 3/2004 |
| GB | 2 408 129 | 5/2005 |
| GB | 2408129 A | 5/2005 |
| WO | WO99/00771 | 6/1998 |
| WO | WO-9900771 A1 | 1/1999 |
| WO | WO 03/073368 | 9/2003 |

OTHER PUBLICATIONS

UK Search Report ~ dated Nov. 29, 2005.

* cited by examiner

DIGITAL PEN AND A METHOD OF STORING DIGITAL RECORDS OF THE USE MADE OF THE DIGITAL PEN

FIELD OF THE INVENTION

This invention relates to a digital pen which includes a reader for use with a memory tag of the kind powered by a signal generated by the reader, and methods of using such.

BACKGROUND OF THE INVENTION

Digital pens of various kinds are known. Generally they incorporate a small camera located adjacent to the nib and which observes the writing made using the pen and stores a digital record of it. For this to have full relevance it is vital that the pen knows where on the page the writing is being made.

If the pen uses Anoto® Functionality, developed by Anoto AB, then the writing must be made onto special paper which is printed with a proprietary pattern of dots which enables the pen to identify the location very accurately. Pens using this functionality are available from a number of manufacturers, including Logitech's "io" pen and Sony-Ericsson's "Chatpen CHA-30". The paper bearing the proprietary pattern is also available from a number of sources in a variety of forms, such as Oxford's Easybook®, Franklin Covey's "iScribe", Esselte's memo notebook and 3M's Post-It® notes.

Digital pens are also available, from Seiko, which are used in combination with a device which is clipped to the page being written onto, the clip incorporating two infra red sensors which enable it to identify where the pen is relative to the device clipped to the page. Such pens can be used with ordinary plain paper.

Figures 1, 2:
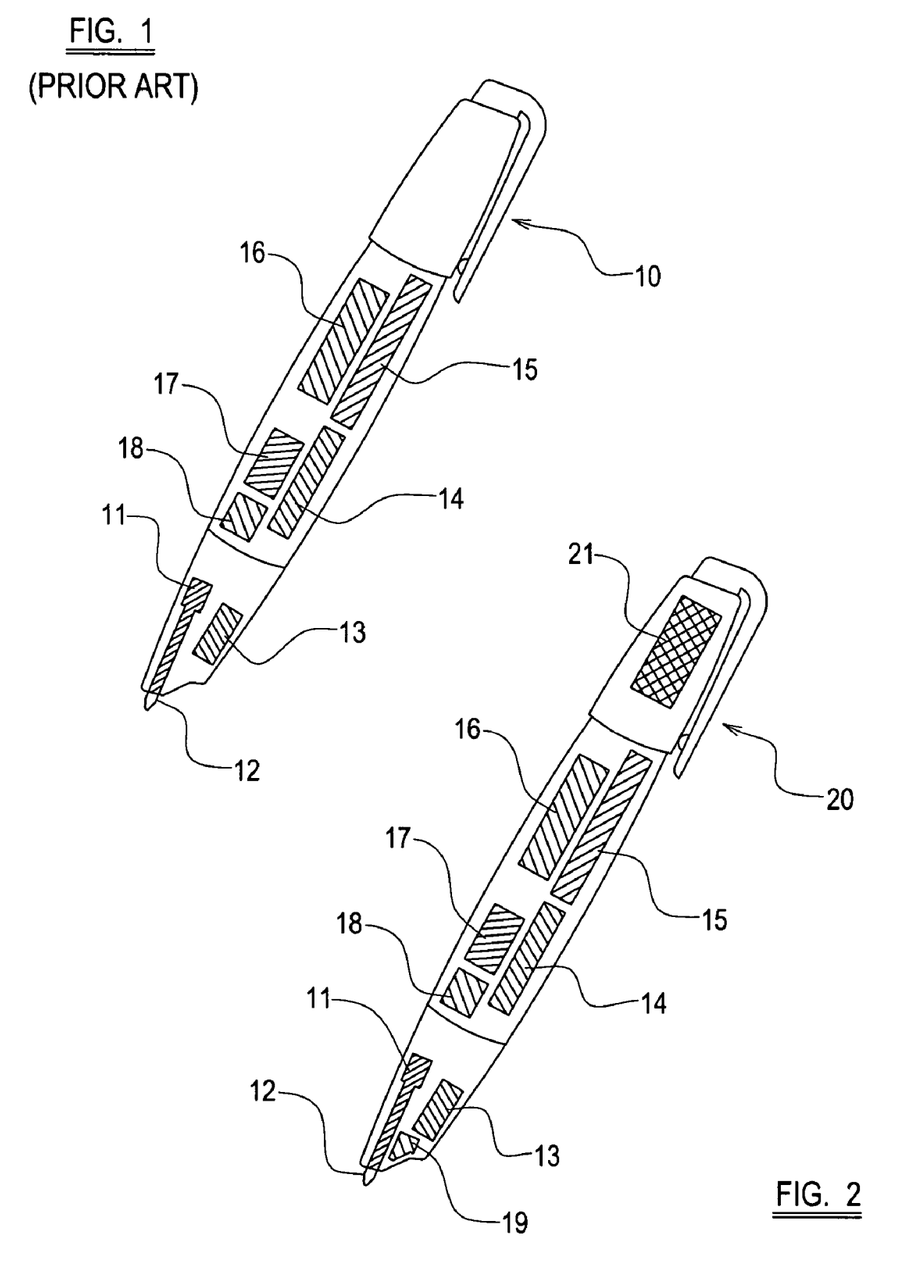
FIG. 1 is a schematic diagram of a prior art digital pen.
FIG. 2 is a schematic diagram of a digital pen/reader combination according to the present invention.

A schematic of a prior art digital pen 10, of the kind which uses Anoto® functionality, is provided in FIG. 1. It includes an ink cartridge 11 with nib 12 for conventional writing, a miniature camera 13 adjacent the nib 12 for observing the writing being made, a processor 14, a read/write memory 15, a battery 16 and a communications unit 17. The camera 13 observes the use made of the pen 10 on the proprietary paper and a digital record of the use made of the pen 10 is processed by the processor 14 stored in the memory 15. The digital record includes what was written or drawn by the pen and where on the pattern of dots on the proprietary paper it was made.

Many prior art digital pens (including Anoto® pens) also include a real time clock 18 in order that the times when it is used can be recorded as part of the digital record of the use. Many also include a unique, unmodifiable identifier (ID) which is "burned in" to memory at the time of manufacture, and which is also included in the digital record of the use made of the pen, such that the source of the digital record can always be identified.

Once the digital information is stored in the digital pen it can be used for a wide, indeed almost infinite, variety of uses. At its simplest it can be downloaded to a computer for long term storage or to control the computer. It can also be used in combination with a mobile phone to, for examples, send a text message to another mobile phone, to send a fax, or to link to the Internet. Transfer of the data from the digital pen to other devices may be via wired connections but is more conveniently wireless, using any appropriate technique such as infra red or Bluetooth.

An aim of the present invention is to provide a new form of digital pen which provides new functionality and opportunities to exploit the technology described above.

SUMMARY OF THE INVENTION

According to a first aspect of this invention there is provided a digital pen having means to sense and create a digital record of the use made of the pen and a memory in which the digital record is stored and wherein the pen further includes a reader for communication with memory tags by inductive coupling, which coupling also powers the memory tags.

Preferably the digital pen further includes a nib for conventional writing and the reader for communication with memory tags is located at the opposite end of the pen from the nib.

Conveniently the means to sense and create a digital record of the use made of the pen includes a camera and/or a pressure sensor.

The digital pen may conveniently include a battery power supply.

The digital pen may further include a switch for control of the reader for communication with memory tags. Alternatively the control of the reader for communication with memory tags may be provided by the standard functionality of the digital pen.

Preferably the digital pen also includes a feedback device to inform the user of when the reader couples to a memory tag. The feedback device may also inform the user of when a data download to or upload from a memory tag has been completed.

The feedback device may include a light source which is illuminated to provide the feedback to the user, or a sound generator which is activated to provide the feedback to the user, or a vibration unit which is activated to provide the feedback to the user.

The digital pen may further include within the memory a set of standard data which is included in any data download to a memory tag. The standard set of data is preferably a unique unmodifiable identifier put into memory during the manufacture of the digital pen.

The digital pen may further include within the memory a plurality of additional sets of standard data. These additional sets of standard data preferably relate to different users of the pen and/or different roles of a user.

The pen further includes a means by which a required set of standard data may be selected for inclusion in a data download to a memory tag. The means by which a required set of standard data may be selected may include a switch and a display, or may require the user to login when they begin a writing session with the pen and logout when they have finished that session. Alternatively the selection means may include the use of biometrics such as handwriting identification or fingerprint identification.

According to a second aspect of the invention there is provided a method of capturing and storing a digital record of the use made of a digital pen including using the digital pen to write or draw, sensing the movement of the pen and creating a digital record of that use, downloading the digital record of the use of the pen to a memory tag using inductive coupling.

Preferably the digital pen includes a nib at one end and a memory tag reader at the other end, and the method includes turning the pen around after using it to write or draw in order to be able to download the digital record to the memory tag.

Preferably the use of the pen is made on a piece of paper or the like and the memory tag is adhered to or incorporated in the piece of paper or the like.

Preferably the digital record of the use made of the pen includes information relating to where on the piece of paper or the like the use was made.

The method may further include downloading the e-signature of the user to the memory tag to sign the digital record. The e-signature may conveniently be downloaded from a personal identification device. Alternatively the e-signature may be downloaded from a personal computer, personal digital assistant, mobile telephone or other personal electronic device.

According to a third aspect of the invention there is provided a personal identification device having stored therein an e-signature of the user.

The personal identification device preferably takes the form of a wearable item, for example a ring for wearing on a finger.

According to a fourth aspect of the invention there is provided in combination a digital pen according to the first aspect of the invention and a personal identification device according to the third aspect of the invention.

BRIEF DESCRIPTION OF THE DRAWINGS

An embodiment of the present invention will now be described by way of example only with reference to the accompanying drawings, wherein.

DETAILED DESCRIPTION OF THE PREFERRED EMBODIMENTS

Referring to FIG. 2, a digital pen/reader combination 20 according to the invention is illustrated schematically, with parts common to the prior art digital pen of FIG. 1 being like referenced. In addition to those common parts the digital pen/reader combination 20 includes a memory tag reader/writer 21, which will be referred to hereinafter as a reader 21 for the sake of simplicity. The reader 21 is provided at the end of the pen/reader combination 20 opposite to the nib 12 for reasons which will become clear in due course.

The camera 13 provides a means to sense and create a digital record of the use made of the pen 20. However, the pen 20 may also include additional means to sense the use made of the pen 20, such as in particular a pressure sensor 19 associated with the nib 12 which can record the pressure applied by the pen 20 to the paper during the use made of the pen 20.

Memory tags are well known in the prior art in a number of forms, and further forms will no doubt be developed. They are small devices which include a memory in which information can be stored, either at the time of manufacture if they are read only devices, or subsequently if they are read/write devices. The information is read from the memory tags by wireless communication with a reader. In the case of read/write devices information is both read from and written to the memory tags by wireless communication with a reader/writer, generally referred to simply as a reader. The wireless communication is achieved using inductive coupling to power the memory tag, with the signal being carried on the same transmission.

One form of memory tag for which the technology is well established is Radio Frequency Identification (RFID) tags and their associated readers, (see for example: RFID Handbook, Klaus Finkenzeller, 1999, John Wiley & Sons). RFID tags come in many forms but all comprise an integrated circuit with information stored on it and a coil which enables it to be interrogated by a read/write device generally referred to as a reader. Until recently RFID tags have been relatively large, due to the frequency they operate at (13.56 MHz) and the size of coil they thus require, and have had very small storage capacities. Such RFID tags have tended to be used in quite simple applications, such as for file tracking within offices or in place of or in addition to bar codes for product identification and supply chain management.

Much smaller RFID tags have also been developed, operating at various frequencies. For example Hitachi-Maxell have developed "coil-on-chip" technology in which the coil required for the inductive link is on the chip rather than attached to it. This results in a memory tag in the form of a chip of 2.5 mm square, which operates at 13.56 MHz. In addition Hitachi has developed a memory tag referred to as a "mu-chip" which is a chip of 0.4 mm square and operates at 2.45 GHz. These smaller memory tags can be used in a variety of different applications. Some are even available for the tagging of pets by implantation.

The readers also take a variety of forms, some being powered by mains electricity and/or having a wired connection to a computer or the like, whilst others are "cordless" being battery powered and have a memory into which data is read from one or more tags before being downloaded to a computer or the like. Such download can be undertaken using known wireless technology, such as infra red or Bluetooth, or it may involve docking the reader in a cradle.

Figure 3:
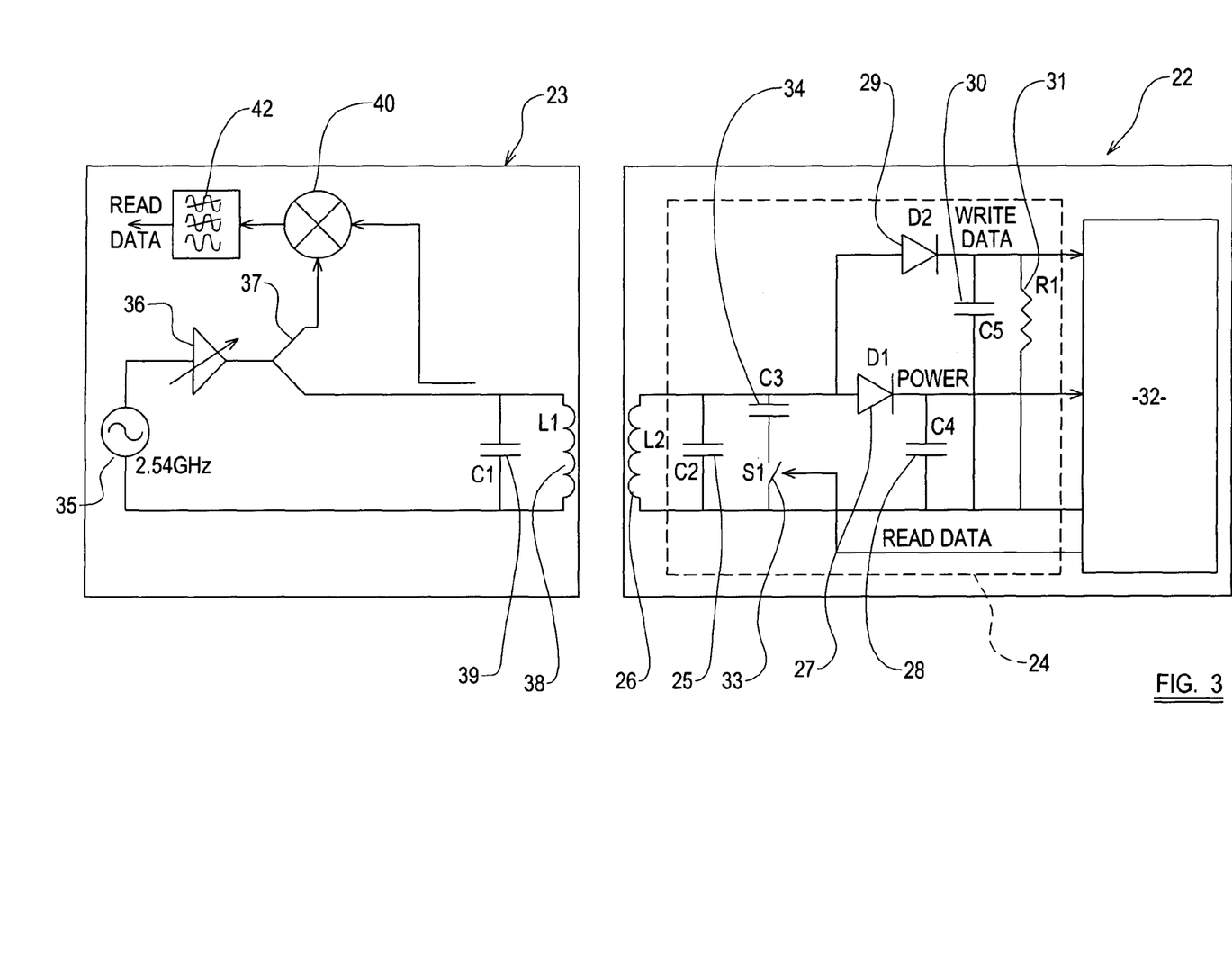
FIG. 3 is a schematic circuit diagram of a reader and memory tag, the reader of which is appropriate for inclusion in the digital pen/reader combination of FIG. 2.

Referring now to FIG. 3, the circuitry of a memory tag 22 and circuitry 23 of the reader 21 are illustrated schematically, using conventional component identifications (C-capacitor, L-inductance, R-resistor, D-diode and S-switch). The memory tag 22 includes an RFID transponder circuit 24 which includes a capacitor C2 (referenced 25) which, in combination with the antenna coil L2 (referenced 26), forms a resonant circuit with component values being chosen to tune the combination to approximately 2.45 GHz for inductive coupling with the reader 21. The portion of transponder circuit 24 responsible for power supply is diode D1 (referenced 27) and capacitor C4 (referenced 28), with diode D1 (27) rectifying the alternating current generated by the inductive coupling and capacitor C4 (28) acting as a power supply storage. The portion of the transponder circuit 24 responsible for receiving transmitted data from the reader 21 is diode D2 (referenced 29), capacitor C5 (referenced 30) and resistor R1 (referenced 31), which form a simple envelope detector; the data thus received is stored in memory 32. The portion of the transponder circuit 24 responsible for the reading of data from the memory 24 is the tuned circuit L2/C2 (25,26) in combination with switch S1 (referenced 33) and capacitor C3 (referenced 34), switching C3 (34) in and out of the circuit using S1 (33) changes the resonance of tuned circuit L2/C2 (25,26) resulting in phase modulation of the reflected power from the memory tag 22 to the reader 21.

The circuit 23 of the reader 21 comprises a signal generator 35 which generates a signal at the chosen frequency of 2.45 GHz. This signal passes via an amplitude modulator 36, where it is amplitude modulated with data to be written to the memory tag 22, and a splitter 37, to an antenna L1 (referenced 38) and capacitor C1 (referenced 39) which form a tuned circuit. The component values of L1 (38) and C1 (39) being chosen to tune it to 2.45 GHz, as for the tuned circuit in the memory tag 22, in order to maximise inductive coupling between the two circuits, and thus transmission of power and data to the memory tag 22.

The splitter 37 takes a part (as much as 50% of the power) of the amplitude modulated signal, for use as a reference signal, and passes it to a multiplier 40. The signal received from the memory tag 22, via the tuned circuit L1/C1 (38,39) and divided from the outgoing signal by a coupler 41, is also passed to the multiplier 40. Thus the transmitted amplitude modulated signal and received signal are multiplied and then pass through a low pass filter 42 to provide a signal comprising the phase modulation from the memory tag 22 and thus indicative of the data read from the memory tag 22. This signal is then passed to the memory 15 of the pen/reader combination 20 to which the reader 21 is connected.

One amplitude modulation format which may be used to apply the data to be transmitted to the 2.45 GHz signal is Amplitude Shift Keying (ASK) which only requires the simple envelope detector D2/C5 (39,30) described in the circuit 24. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 22.

With the apparatus of memory tag 22 and reader 21 described above power transfer of around 25% can be achieved with a distance of around 1.8 mm between the antennae L1 (38) and L2 (26), of the reader 21 and memory tag 22 respectively. This is sufficient to transfer enough power to the memory tag 22 for it to operate.

Figure 4:
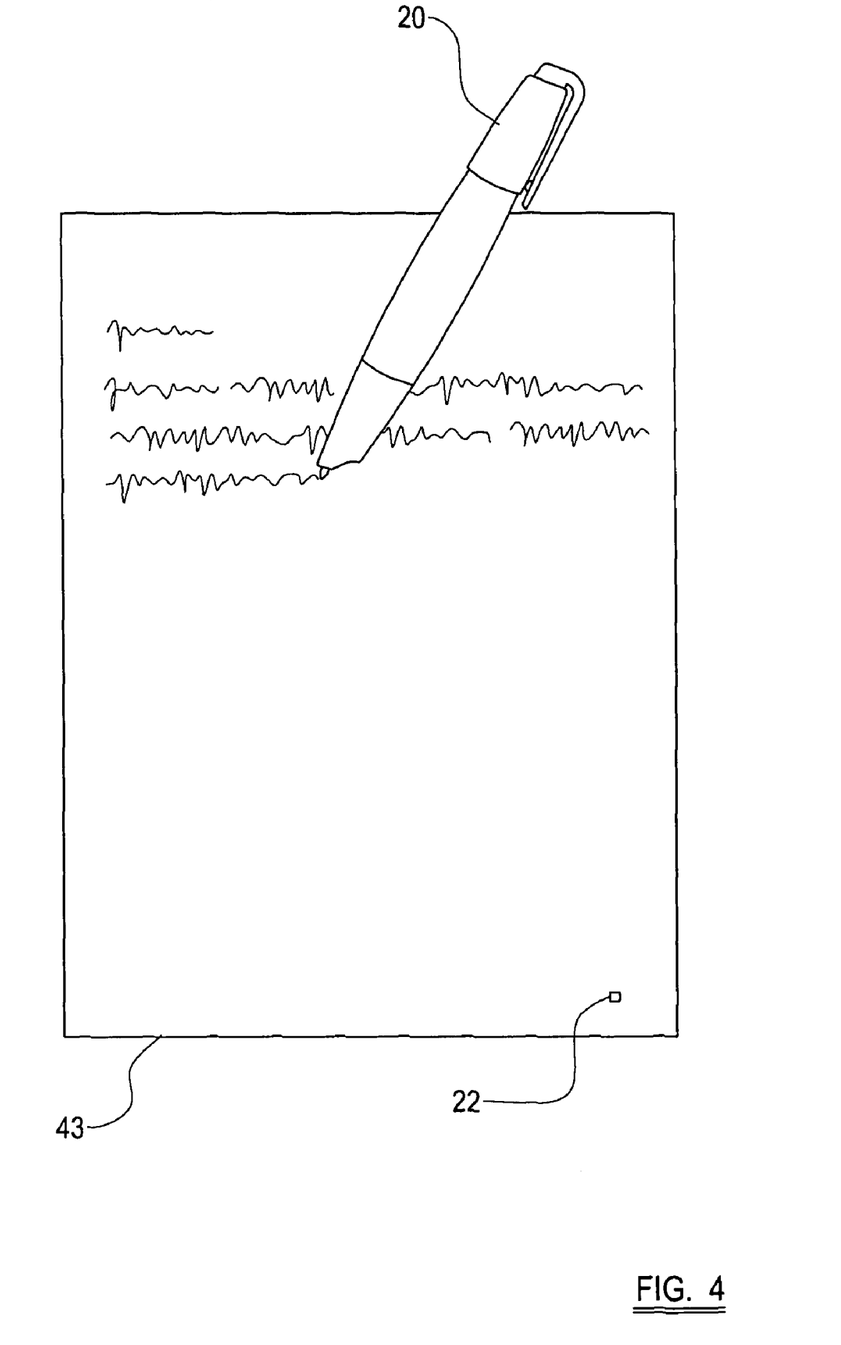
FIGS. 4 and 5 illustrate the digital pen/reader combination of FIG. 2 in use.
Figure 5:
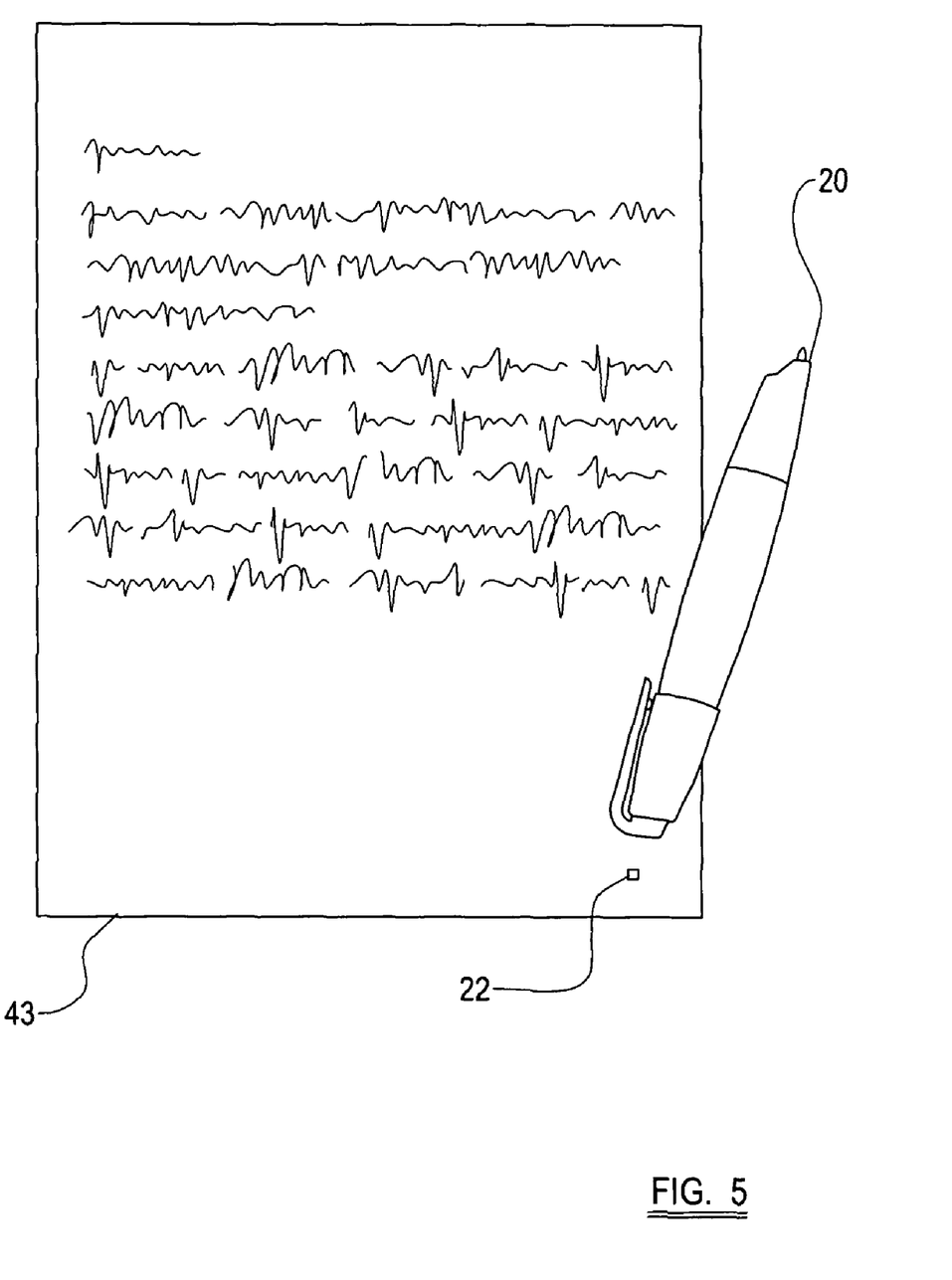

The pen/reader combination 20 may be used as follows, as illustrated in FIGS. 4 and 5. The pen 20 is used to write text or draw onto a page 43 with a memory tag 22 attached to or embedded in it. The camera 13 observes the writing being made and the pressure sensor 19 records the pressures applied during that use. The signals from the camera 13, pressure sensor 19, and real-time clock 18 are passed to the processor 14, which creates a digital record of the use made of the pen, i.e. the text written with it or the other marks made such as a diagram, and passes that digital record to the memory 15 for storage. The digital record of the use made of the pen therefore includes information about stroke order, velocity, pressure and time of use, the unique ID of the pen used and preferably also user ID (as discussed below).

Once the user has completed their writing, they lift the pen/reader combination 20 away from the page 43, turn the pen/reader combination 20 around such that reader 21 is nearer the page 43 and take it adjacent to the memory tag 22. The reader 21 couples to the memory tag 22 as described above, and the contents of the memory 15 in the pen/reader combination 20 is downloaded into the memory 32 of the memory tag 22. Thus in this example the memory tag 22 on the page 43 is used to store the digital record of the creation of the text, or other markings, on the page.

This sequence may be repeated to add data captured in multiple writing sessions. Such additional data may come from the same pen 20 or one or more different pens, and from a single user for each pen or multiple users. Each time the digital record of the particular writing session will be added to the memory log, with a time stamp, pen ID and preferably also user ID (as discussed below). Each time a new session is undertaken the complete record of previous use may be uploaded into the pen 20 thus "synching" the data in the pen 20 with the data in the memory tag 22 and providing a complete audit of the use made of the pen 20. This could be used in business workflows where a number of users have worked on or approved a document in a certain order, ensuring that no modifications were made between each session.

Having the reader 21 at the opposite end of the pen/reader combination 20 from the nib 12 ensures that the reader 21 does not couple to a memory tag accidentally during the writing of the text, or other information, onto the page. However, the reader 21 need not be located at the opposite end from the nib 12 if a switch is provided to control when the reader 21 is powered up for coupling to a memory tag.

For pen/reader combinations 20 which use Anoto® Functionality (i.e. the "standard functionality" of the Anoto® system) the uploading or downloading of data to or from a memory tag may be controlled by using the "Magic box" printed on the paper bearing the proprietary pattern of dots, in the same way that transmission of data from prior art digital pens using this functionality may be controlled. Indeed, if the memory tag 22 is located at the location of a "Magic Box" then bringing the nib of the pen adjacent to that "Magic Box" could be the trigger to power up the reader 21. This would enable the reader 21 to be located at the same end of the pen as the nib without the need for a physical switch.

It would also be advantageous for the pen/reader combination 20 to include some form of feedback device such that the user knows when coupling to a memory tag has been achieved. This may take any one of a number of forms. For examples an LED which lights up, a small noise generator which beeps, or a vibration unit (such as used in mobile telephones and in the prior art Anoto® digital pens) which vibrates.

Provided the storage capacity of the memory tags concerned is adequate, the digital record of the creation of several pages of text by the pen may be stored in a single memory tag. For example a multi-page document, such as an application form, may have a single memory tag located at the start or finish in which the digital record of the completion of the form by the applicant is stored. This may be a particularly beneficial use as a digital record of the signature contains much more information than the simple signature on the page, as the manner in which it was created (stroke order, velocity, pressure etc.) is also stored as well as the finished product. This would therefore provide a higher level of security and help to reduce fraud.

Depending on the memory available in the memory tag 22, some information about the use of the pen 20, such as that relating to pressure, may only be stored for particularly important uses, such as signatures.

It may also be desirable to read digitised handwriting, or other information, stored in a memory tag back into the pen for various uses including downloading to a different memory tag, or for transmission by the pen's own communication unit 17 to another electronic device, e.g. computer, for storage or use.

As previously mentioned the memory 15 of the pen/reader combination 20 includes a standard set of data, the unique pen ID, which cannot be modified and which identifies the pen, and which is always downloaded at the start or end of every data download. Preferably the memory 15 of the pen/reader combination 20 also includes several other sets of standard data, for example one for each of the possible users (user IDs), and a means by which the relevant set of standard data is selectable for inclusion in the data download. Such selection means may take the form of a switch and a simple display, with the switch being used to control what appears on the display and then to select the appropriate option as required. Other kinds of standard data may relate to the different uses made of the pen 20, e.g. if the pen is used by the same person for both business and personal use (i.e. for different roles), there may be sets of standard data which can be used to identify which kind of use is being made of the pen at any one time. That is the same person may have more than one user ID, such that each of their Ids identifies them and their role.

Other forms of selection means may also be incorporated into digital pens according to the invention. One option may be to have a user login/logout mechanism, which could of course be used to identify both the person and the capacity, or role, in which they are operating at any particular time. One method of logging in which could be employed is for each user to have a badge which, when the pen is used on it, is recognised and selects the appropriate set of standard data for the holder of the badge and their current role (for further information on such an option see Research Disclosure No. 481037, May 2004). Another option is to use biometrics to identify the user of the pen 20 at any particular time. This could include handwriting identification, as the use being made of the pen is being recorded in any event, and this would only require addition of software. An alternative biometric would be fingerprint identification by incorporating a suitable sensor into the pen 20.

Yet another option for selection of the appropriate set of standard data is for it to be determined by a feature of the document on which the pen is used. For example, if the pen is being used to complete a standard form of some kind, then entering certain text in certain fields or ticking a certain box, may determine the use being made of the pen and cause it to select the appropriate set of standard data to include in the digital record of that use. Alternatively the information used to select the standard data set may, at least in part, be contained within the memory tag 22 associated with the document and may be read into the pen 20 using the reader 21.

The unique pen ID and/or the user ID selected, both of which are included in the digital record of the use made of the pen, may have associated with them public/private key pairs. The private keys may be used to encrypt the digital record of the use made of the pen, which could be decrypted by anyone using the appropriate public key. This would ensure that the origin of the digital record was as claimed, i.e. that is was created using the particular pen and/or by the person concerned. Further security may be provided by the use of e-signatures to "sign" the contents of the memory tag 22. The use of e-signatures has been much discussed and details can be found for example in "E-signatures—Digital and Electronic: Technology Overview" by Kristen Noakes-Fry of Gartner, Inc. (Document No. DPRO-91585 dated 17 Jun. 2003), with such documents being accessible via their website www.gartner.com. Conveniently the user of the pen/reader combination 20 will also possess a personal identification device which contains their e-signature and which can communicate directly with memory tags by the usual means of inductive coupling. Thus, once the user has created the document, and read the information from the memory 15 of the pen/reader combination 20 into the memory tag 22, they then place their personal identification device adjacent to the memory tag 22 and download their e-signature, as described in more detail below. The personal identification device might for convenience be a wearable item, such as a ring, a watch, a bracelet, or a pendant. Instead of communicating with the memory tag 22 the personal identification device may communicate with the pen 20, such that the e-signature is uploaded into the pen and incorporated into the digital record of the use made of the pen.

A personal identification device may have stored within it multiple e-signatures for different scenarios, applications, or roles, for example business and personal use.

Figure 6:
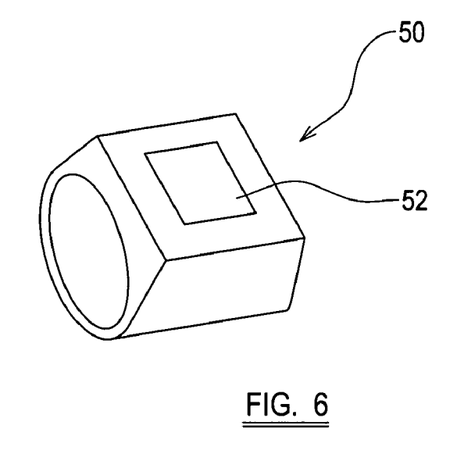
FIG. 6 is a schematic diagram of a personal identification device according to another aspect of the invention, in the form of a digital signet ring.
Figure 7:
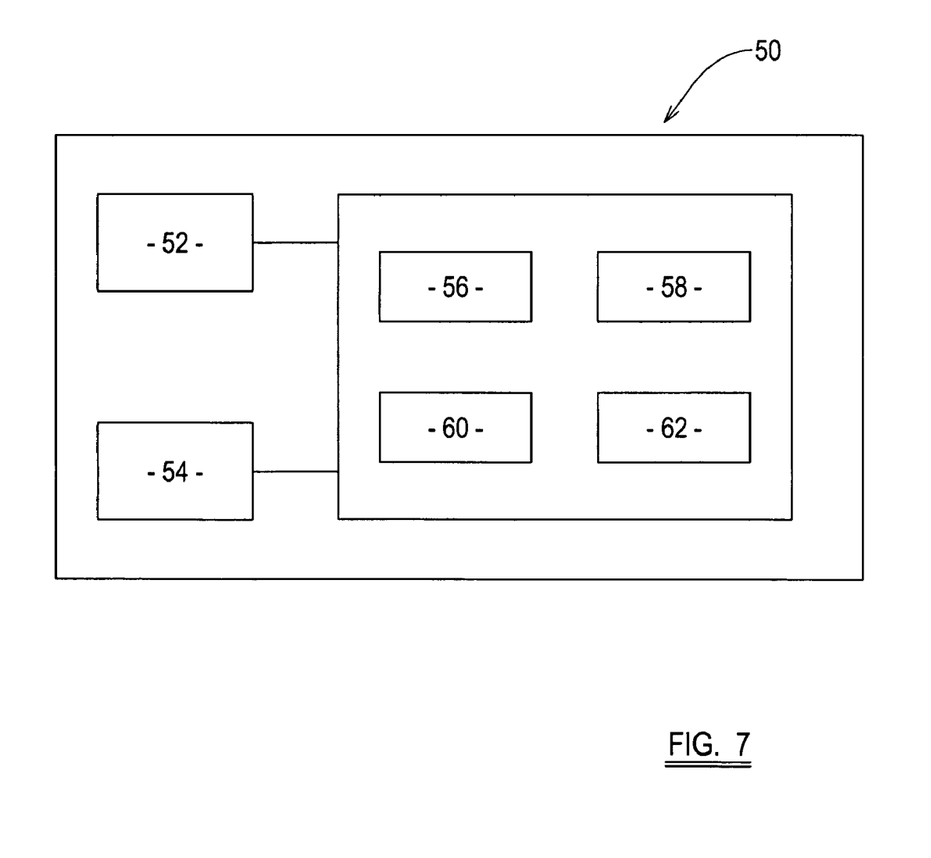
FIG. 7 is a schematic diagram of the functional blocks within the personal identification device of FIG. 6.

A personal identification device in the form of a digital signet ring 50 is illustrated in FIGS. 6 and 7, the former being a rough indication of the appearance of the ring and the latter illustrating the functional blocks incorporated within it. The ring 50 includes a display 52, although it may if appropriate have alternative means of providing feedback to the user, such as those referred to above with regard to the pen/reader combination 20. The ring 50 also includes a power source 54, which will typically be a battery but might comprise a solar cell or any other suitable form. In addition the ring 50 includes a processor 56, a memory 58, which may be of any suitable form, such as write once form and/or of read/write form, and an RFID type transceiver 60 for communication with memory tags and other devices which communicate by inductive coupling. The ring 50 may also include, as shown in FIG. 7, a transceiver 62 for another form of wireless communication, such as bluetooth, with other devices if required. Preferably it also has an unmodifiable unique identifier (ID) stored in memory, and a real-time clock so that uses of the ring can be date/time stamped.

The memory 58 of the ring 50 may include a record of the e-signature of the user, which may be stored in write once memory. Alternatively, provided the ring 50 does include an umnodifiable unique identifier, the storage of the user e-signature(s) issued by appropriate Certificate Authorities may be stored in read/write memory and can be replaced if the user of the ring 50 changes. The memory 58 of the ring 50 may also include read/write memory which may conveniently be used to store a record of the uses made of the e-signature, with information such as date and time of use, and a copy of the document signed or at least a reference to it such as an identification code. This information would provide an audit trail such that the user could later trace which documents were approved and when.

When the user wishes to "sign" a document created with the pen/reader combination 20 and subsequently stored in a memory tag 22, they place their ring 50, or other personal identification device, adjacent to the memory tag 22 such that inductive coupling can take place as described above. The e-signature contained within the memory 58 of the ring 50 is downloaded to the memory tag 22 and stored there with the document. Preferably a hash of the document contents, or a copy of the document contents, is encrypted with the users private key (contained within the e-signature) such that it is absolutely clear exactly what the user "signed" and to prevent later alterations being made. The use of date/time stamping of the digital record, as previously discussed, would also provide security.

E-signatures may also be downloaded from an appropriate Certificate Authority via other means such as a personal computer, personal digital assistant (commonly known as PDA), or mobile phone, or other personal electronic device, into the pen 20, before download of the data to the memory tag 22.

It will be apparent that the present invention may be used with any type of digital pen (if appropriate using the relevant "standard functionality" the digital pen provides e.g. Anoto® functionality), memory tag and reader other than those disclosed herein. In particular other forms of memory tags, other than RFID tags, are also known, and the present invention may include such tags in place of the RFID tags described. In addition digital pens may not include a camera, but instead may include other forms of sensor which detect the location of the pen and monitor its movement when in an "on" or "marking" mode to create the digital record of the use made of it, and the present invention may include such pens in place of those with cameras described above. Finally, other forms of personal identification devices may be used.

Furthermore, although the invention has been described as a digital pen, it may be implemented with a stylus or other pointing device which does not include a nib and cannot be used to create a physical record (i.e. visible writing). Such a "digital pen" would still create a digital record of the use made of it but would not create a physical record as well. This would be particularly appropriate for use when the subject matter to which the use relates is confidential, as access to the digital record of use can be controlled much more readily than can access to the physical record of such use.

In the present specification "comprises" means "includes or consists of" and "comprising" means "including or consisting of".

The invention claimed is:

1. A digital pen having:
   means to sense and create a digital record of the use made of the pen, said means including a camera and a pressure sensor,
   a memory in which is stored a unique unmodifiable identifier of the pen, a plurality of standard sets of data relating to users of the pen and their roles, and in which the digital record is stored,
   means to select an appropriate standard set of data relating to a particular user of the pen and their role,
   a nib, and
   a wireless memory reader and writer for communication with memory tags by inductive coupling, wherein the coupling also powers the memory tags, and wherein the wireless memory tag reader and writer is configured to download the digital record of the use made of the pen to at least one of the memory tags,
   wherein the wireless memory tag reader and writer is located near an opposite end of the pen from the nib.

2. A digital pen according to claim 1, wherein the memory tags are RFID tags.

3. A digital pen having:
   means to sense and create a digital record of the use made of the pen, said means including a camera and a pressure sensor,
   a memory in which is stored a unique unmodifiable identifier of the pen and in which the digital record is stored,
   a nib, and
   a wireless memory reader and writer for communication with memory tags by inductive coupling, wherein the coupling also powers the memory tags, and wherein the wireless memory tag reader and writer is configured to download the digital record of the use made of the pen to at least one of the memory tags,
   wherein the wireless memory tag reader and writer is located near an opposite end of the pen from the nib.

4. A digital pen according to claim 3, wherein the memory tags are RFID tags.

5. A digital pen having means to sense and create a digital record of the use made of the pen and a memory in which the digital record is stored, wherein the pen further includes:
   a wireless memory tag reader and writer for communication with memory tags by inductive coupling, wherein the inductive coupling also powers the memory tags, and wherein the wireless memory tag reader and writer is configured to download the digital record of the use made of the pen to at least one of the memory tags; and
   a nib, and wherein the wireless memory tag reader and writer is located near an opposite end of the pen from the nib.

6. A digital pen according to claim 5 wherein the means to sense and create a digital record of the use made of the pen includes a camera.

7. A digital pen according to claim 5 wherein the means to sense and create a digital record of the use made of the pen includes a pressure sensor.

8. A digital pen according to claim 5 further comprising a battery power supply.

9. A digital pen according to claim 5 further comprising a switch for control of the wireless memory tag reader and writer for communication with memory tags.

10. A digital pen according to claim 5 wherein the control of the wireless memory tag reader and writer for communication with memory tags is provided by the standard functionality of the digital pen.

11. A digital pen according to claim 5 further comprising a feedback device to inform the user of when the wireless memory tag reader and writer couples to a memory tag.

12. A digital pen according to claim 11 wherein the feedback device also informs the user of when a data download to or upload from a memory tag has been completed.

13. A digital pen according to claim 11 wherein the feedback device includes a light source which is illuminated to provide feedback to the user.

14. A digital pen according to claim 11 wherein the feedback device includes a sound generator which is activated to provide feedback to the user.

15. A digital pen according to claim 11 wherein the feedback device includes a vibration unit which is activated to provide feedback to the user.

16. A digital pen according to claim 5 further comprising, within the memory, a set of standard data which is included in any data download to a memory tag.

17. A digital pen according to claim 16 wherein the standard set of data is a unique unmodifiable identifier put into memory during the manufacture of the digital pen.

18. A digital pen according to claim 17 wherein a private/public key pair is associated with the unique unmodifiable identifier of the pen, and the private key is used to encrypt the digital record made of the use made of the pen, and wherein the wireless memory tag reader and writer is configured to download the encrypted digital record made of the use made of the pen to the at least one of the memory tags.

19. A digital pen according to claim 18 wherein the means by which a required set of standard data may be selected includes reading information from a memory tag associated with a document on which the pen is being used.

20. A digital pen according to claim 18 wherein the means by which a required set of standard data may be selected includes detecting the use made of the pen on a document.

21. A digital pen according to claim 16 further comprising, within the memory, a plurality of additional sets of standard data and a means by which a required set of standard data may be selected for inclusion in a data download to a memory tag.

22. A digital pen according to claim 21 wherein the additional sets of standard data relate to different users of the pen and/or different roles of a user of the pen and function as user identifiers.

23. A digital pen according to claim 22 wherein each user identifier has associated with it a public/private key pair, and the private key is used to encrypt the digital record made of the use made of the pen, and wherein the wireless memory tag reader and writer is configured to download the encrypted digital record made of the use made of the pen to the at least one of the memory tags.

24. A digital pen according to claim 21 wherein the means by which a required set of standard data may be selected includes a switch and a display.

25. A digital pen according to claim 21 wherein the means by which a required set of standard data may be selected includes the user logging in when starting a writing session with the pen and logging out when they have finished the writing session.

26. A digital pen according to claim 21 wherein the means by which a required set of standard data may be selected includes the use of biometrics.

27. A digital pen according to claim 26 wherein the use of biometrics includes identifying the user of the pen by identifying the handwriting being created by the use of the pen.

28. A digital pen according to claim 27 wherein the use of biometrics includes identifying the user of the pen using their fingerprint.

29. A digital pen according to claim 5, wherein the memory tags are RFID tags.

* * * * *